(12) United States Patent
Wadley et al.

(10) Patent No.: US 9,921,037 B2
(45) Date of Patent: Mar. 20, 2018

(54) HYBRID PERIODIC CELLULAR MATERIAL STRUCTURES, SYSTEMS, AND METHODS FOR BLAST AND BALLISTIC PROTECTION

(75) Inventors: Haydn N. G. Wadley, Keswick, VA (US); Yellapu V. Murty, Charlottesville, VA (US); Tyrone Jones, Bel Air, MD (US); Rahul Gupta, Wilmington, DE (US); Matthew Burkins, Forest Hill, MD (US)

(73) Assignee: University of Virginia Patent Foundation, Charlottesville, VA (US)

( * ) Notice: Subject to any disclaimer, the term of this patent is extended or adjusted under 35 U.S.C. 154(b) by 1234 days.

(21) Appl. No.: 12/673,418

(22) PCT Filed: Jul. 31, 2008

(86) PCT No.: PCT/US2008/071848
§ 371 (c)(1),
(2), (4) Date: Jul. 5, 2011

(87) PCT Pub. No.: WO2009/048676
PCT Pub. Date: Apr. 16, 2009

(65) Prior Publication Data
US 2011/0283873 A1  Nov. 24, 2011

Related U.S. Application Data

(60) Provisional application No. 60/965,203, filed on Aug. 16, 2007.

(51) Int. Cl.
*F41H 5/04* (2006.01)
*B63B 3/10* (2006.01)
(Continued)

(52) U.S. Cl.
CPC ............... *F41H 5/023* (2013.01); *B32B 3/12* (2013.01); *B32B 5/02* (2013.01); *B32B 15/04* (2013.01);
(Continued)

(58) Field of Classification Search
USPC ...... 89/36.02, 904, 914, 915, 910, 917, 930, 89/920; 428/316.6
See application file for complete search history.

(56) References Cited

U.S. PATENT DOCUMENTS 5,315,203 A   5/1994  Bicos
5,364,679 A   11/1994 Groves
(Continued)

*Primary Examiner* — Hai Vo
(74) *Attorney, Agent, or Firm* — Vorys, Sater, Seymour and Pease LLP; Vincent M DeLuca; Robert J Decker

(57) ABSTRACT

Structures based upon periodic cellular materials that provide a potential for defeating combinations of both air blast loading and ballistic attack either sequentially or simultaneously, or combination of both. The cellular structures may also be configured to meet the stiffness and strength support requirements of particular vehicle or other applications, systems or structures. The armor is therefore potentially able to support normal service loads and defeat blast and ballistic threats when necessary. The structure provides for using efficient load support capabilities of the material (without a high armor protection level) in low threat conditions, as well as the ability to modify the system to increase its level protection to a desired or required level. This would reduce the weight of the protection system in normal (low threat) conditions which reduces vehicle wear and tear, as well as cost savings in fabrication of applicable structures or systems.

44 Claims, 10 Drawing Sheets

(51) Int. Cl.
  *B64G 1/52*    (2006.01)
  *B64D 45/00*   (2006.01)
  *F41H 7/02*    (2006.01)
  *F41H 5/24*    (2006.01)
  *F41H 5/02*    (2006.01)
  *B32B 3/12*    (2006.01)
  *B32B 5/02*    (2006.01)
  *B32B 15/04*   (2006.01)

(52) U.S. Cl.
  CPC ......... *F41H 5/0414* (2013.01); *F41H 5/0442* (2013.01); *F41H 5/0471* (2013.01)

(56) References Cited

U.S. PATENT DOCUMENTS

| | | | |
|---|---|---|---|
| 5,534,343 | A | 7/1996 | Landi et al. |
| 6,826,996 | B2 | 12/2004 | Strait |
| 7,621,435 | B2 * | 11/2009 | Vecchio et al. ............... 228/101 |
| 2005/0217471 | A1 * | 10/2005 | Benitsch ...................... 89/36.02 |
| 2006/0048640 | A1 | 3/2006 | Terry et al. |
| 2006/0080835 | A1 * | 4/2006 | Kooistra et al. ........... 29/897.34 |
| 2006/0163319 | A1 * | 7/2006 | Ervin et al. ................... 228/101 |

* cited by examiner

HYBRID PERIODIC CELLULAR MATERIAL STRUCTURES, SYSTEMS, AND METHODS FOR BLAST AND BALLISTIC PROTECTION

RELATED APPLICATIONS

The present invention claims priority from U.S. Provisional Application Ser. No. 60/965,203, filed Aug. 17, 2007, entitled "Hybrid Periodic Cellular Material Structures, Systems, and Methods for Blast and Ballistic Protection," the disclosure of which is hereby incorporated by reference herein in its entirety.

GOVERNMENT SUPPORT

Work described herein was supported by Federal Grant No. N00014-00-1-0342, awarded by Office of Naval Research. The Government has certain rights in the invention.

BACKGROUND OF THE INVENTION

The need for ballistic and blast protection for vehicles and personnel are becoming more increasingly complex. Modern weapons and their improvised variants utilize high-amplitude, overpressure waves and high-explosive projectiles to cause damage to vehicles and people. High-explosive projectiles can propagate at much higher velocity and therefore carry more kinetic energy than bullets fired from a rifle, which are launched by propellants with a lower detonation velocity. Adversaries are able to quickly change the combination of blast and projectile loading of a structure and so it is necessary to develop armor solutions that can be quickly and inexpensively modified to meet these changing threat environments. Hence, a significant interest in developing armor solutions that offers protection against fragment and air blasts are needed.

These solutions must also be able to defeat more conventional projectiles such as bullets (including armor piercing and higher caliber, heavy machine gun rounds). If these solutions are to be utilized on mobile platforms it is essential that they mitigate a specific threat level at the lowest possible mass per unit area of protection (i.e., at the lowest specific mass or aerial density of the armor. Periodic Cellular Materials (PCM) materials are an emerging class materials and structures that are being studied for light weight structures and other multifunctional applications such as thermal management.

Commercially available stochastic foams can be effective at shock mitigation but suffer from severe limitations for the most demanding structural and multifunctional applications because they have low strength (strut bending) modes of failure. As a result, polymer and metal foams exhibit very limited crush resistance during static or dynamic compression.

Honeycombs can also be problematic for many applications because the stress needed to initiate core crushing during shock mitigation is much higher than the stress required to cause cell collapse. This results in larger force transmission through the structure. They also have a closed cell topology which can make them susceptible to corrosion and delamination.

In the low core weight configurations of most interest, the webs fail by elastic buckling which makes inefficient use of the core material in a sandwich panel construction intended for load support.

SUMMARY OF INVENTION

Examples Periodic Cellular Materials (PCM) materials are shown in FIG. 1. They are particularly efficient at load support when structured, as shown, as the cores of sandwich panel structures. FIG. 1 provides schematic illustrations of examples of periodic cellular material topologies, such as honeycombs and corrugations that may be used for cores of sandwich panels 100, as well as cellular topologies that include lattice materials made from trusses such as tetrahedral, pyramidal, and 3-D Kagome.

FIG. 1 schematically illustrates structural arrangements that may be employed in the context as an aspect of the invention, such as honeycomb structures and corrugated (prismatic) structures. FIGS. 1(A)-(C) include exemplary honeycomb structures that respectively comprise hexagonal cell, square cell, and triangular cell structures.

FIGS. 1 (D)-(F) schematically illustrate exemplary corrugated structures that may include triangular corrugation, diamond or multi-layered corrugation, and flat-top or sometimes referred to as Navtruss® corrugation arrangements, respectively.

FIGS. 1(G)-(I) schematically illustrate a tetrahedral structural arrangement; a pyramidal structural arrangement; a three-dimensional Kagomé structural arrangement, respectively. Other honeycomb or corrugated structural arrangements may, of course, be employed.

FIG. 7 schematically illustrate structural arrangements of a sandwich panel 700 that may be employed in the context as an aspect of the invention, such as cellular or lattice. FIGS. 7(A)-(F) illustrate square honeycomb, triangular honeycomb, pyramidal lattice, woven wire mesh lattice, triangular corrugation, and diamond corrugation, respectively.

These arrangements exhibit excellent impact energy absorption characteristics and have been shown to be very effective at withstanding high intensity dynamic loads. Available methods for fabricating planar and curved structures from titanium-, iron-, nickel-, copper-, and aluminum-based alloys are considered part of the present invention. Available methods for the fabrication of similar structures from composites and ceramics of all types are also considered part of the present invention. Other open cell lattice topologies may, of course, be employed within the context of the invention.

Many variants of the periodic cellular material topologies have been developed by the University of Virginia and are commercially supplied by CMI, Inc. as Trusscore™ materials. For example, on application of the periodic cellular material topologies include the mitigation of underwater blasts.

An aspect of various embodiments of the present invention include structures based upon periodic cellular materials that provide a potential for defeating combinations of both air blast loading and ballistic attack either sequentially or simultaneously, or combination of both. Depending on the design requirements, these cellular structures of various embodiments of the present invention can also be configured to meet the stiffness and strength support requirements of particular vehicle or other applications, systems or structures. The present invention embodiment of the armor is therefore potentially able to support normal service loads and defeat blast and ballistic threats when necessary. An aspect of various embodiments of the present invention also provides a possibility of using the efficient load support capabilities of the material (without a high armor protection level) in low threat conditions and then modify the system to increase its level protection to a desired or required level.

This would reduce the weight of the protection system in normal (low threat) conditions which reduces vehicle wear and tear, as well as cost savings in fabrication of applicable structures or systems.

The core morphology including the dimensions of the core components (including core relative density), the specific materials used for core and face sheet fabrication, and the core/face sheet nodal strength and area can be varied to meet specific requirements. The core type by it self provides certain unique characteristic features.

In an approach, the PCM materials of most interest are based upon truss structures and are often referred to as lattice materials. Their higher performance results in part from their design based on micromechanical models that incorporating the underlying structural physics. These considerations contribute to the design of structures that are stretch dominated and less susceptible to failure by elastic buckling and strut bending than foams and even honeycombs at low relative density. The core manifestations that evolved from this design methodology include, but are not limited to the truss based Pyramidal, Tetrahedral and Kagome morphology, and various structures based upon collinear wire/tube lay-ups and structures fabricated from textiles. Each of these structures has been shown to out perform foam equivalents and some are more structurally efficient than honeycombs. All the core morphologies are considered to provide significant structural weight savings due to their high through thickness stiffness and shear resistance features.

An enabling concept that underpins at least some of the embodiments of the present inventions described here is, but not limited thereto, a unique combination of these topology concepts with hard, strong materials or with those that require very high energy dissipation for penetration to provide structures that (i) efficiently support static and fatigue loads, (ii) mitigate the blast pressure transmitted to a system that they protect and (iii) provide very effective resistance to projectile penetration.

An aspect of an embodiment of the present invention provides a sandwich structure for supporting loads, mitigating blast pressure, and/or resisting projectile penetration. The structure may comprise a core, whereby the core may include a first open-cell lattice structure layer, a second open-cell lattice structure layer, and an intermediate panel. The intermediate panel may be disposed between the first open-cell lattice structure layer and the second open-cell lattice structure layer. Additionally, the structure may comprise a first layer panel in mechanical communication with the first open-cell lattice structure layer distal from the second open-cell lattice structure layer; a second layer panel in mechanical communication with the second open-cell lattice structure layer distal from the first open-cell lattice structure layer; and a plurality of interstitial housings. The interstitial housings may be disposed across either the first open-cell lattice structure or the second open-cell lattice structure, or both or the first open-cell lattice structure or the second open-cell lattice structure. The interstitial housings may conform to the void created by the open cells of the first and second open-cell lattice structures. Further still, the structure may comprise a filler portion disposed between voids created between the interstitial housing and either the first open-cell lattice structure or the second open-cell lattice structure, or both of the first open-cell lattice structure or the second open-cell lattice structure. The filler portion may conform to the void created by the open cells of the first and second open-cell lattice structures and the interstitial housings.

An aspect of an embodiment of the present invention provides a method of manufacturing the aforementioned sandwich structure that may be utilized for supporting loads, mitigating blast pressure, and/or resisting projectile penetration. The aforementioned structure may comprise the core (which may include the first open-cell lattice structure layer, the second open-cell lattice structure layer, and the intermediate panel); the first layer panel; and the second layer panel. Any or all of such components of the structure may be provided for by coupling them together to form the sandwich structure. The coupling method may be a variety of techniques, methods or structures, such as but not limited thereto, the following: welding, friction stir welding, diffusion bonding, bonding, extrusion process, adhesive process, mechanical fastening process, combined extrusion and machining process, or any combination thereof, and other joining, fastening or coupling methods as desired or required.

These and other objects, along with advantages and features of the invention disclosed herein, will be made more apparent from the description, drawings and claims that follow.

BRIEF DESCRIPTION OF THE DRAWINGS

The accompanying drawings, which are incorporated into and form a part of the instant specification, illustrate several aspects and embodiments of the present invention and, together with the description herein, and serve to explain the principles of the invention. The drawings are provided only for the purpose of illustrating select embodiments of the invention and are not to be construed as limiting the invention.

DETAILED DESCRIPTION OF THE INVENTION

Figure 1A:
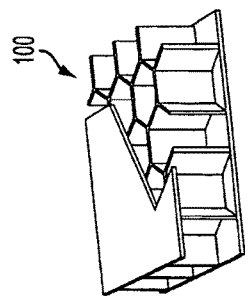
FIG. 1 provides schematic perspective views of examples of periodic cellular material topologies as an aspect of various embodiments of the present invention.
Figure 1B:
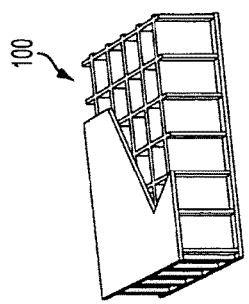
Figure 1C:
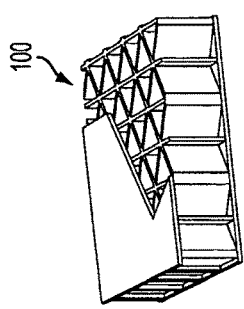
Figure 1D:
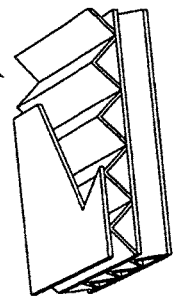
Figure 1E:
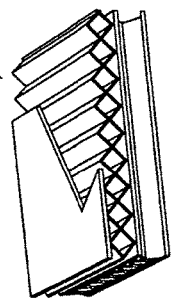
Figure 1F:
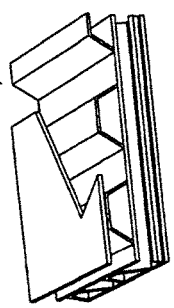
Figure 1G:
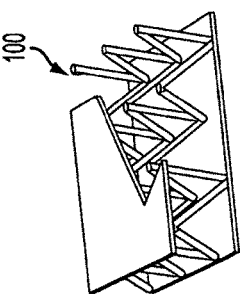
Figure 1H:
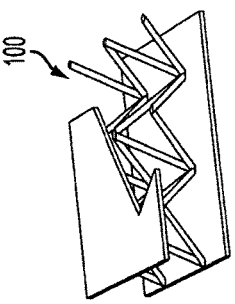
Figure 1I:
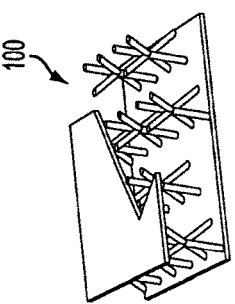
Figure 2:
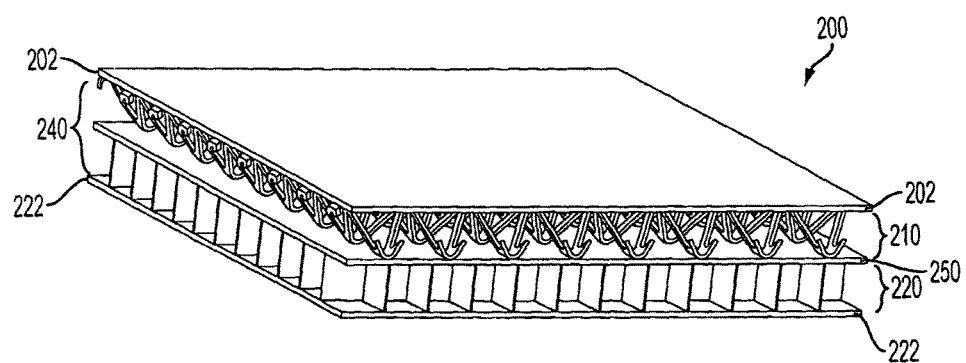
FIG. 2 provide a schematic perspective view of a two layer PCM Panel that combines Square Honeycomb core and a Pyramidal Trusscore as an aspect of an embodiment of the invention.

An aspect of various embodiments of the current invention provides, among other things, core combinations from the PCM family of material structures with hard ceramics and/or ballistic fabrics, a superior armor design can be created which also functions as a structural component (such as a vehicle door or floor). These structural components then provide, among other things, a light weight solution various blast and ballistic threats. An Exemplary approach is based upon multilayering to provide different properties as a function of depth within a sandwich panel. These layers can be added to provide a sandwich panel structure 200 to increase the type and level of protection. One example is shown in FIG. 2. The sandwich structure 200 comprises a first layer 210, a second layer 220 with an intermediate member 250 there between to form a core 240. On opposite sides of the sandwich structure 200 is a front panel 202 and a back panel 222. This particular, non-limiting example provides a periodic cellular material (PCM) panel 200 that combines a square honeycomb in the second layer 220 and pyramidal truss core in the first layer 210 using a thin intermediate face sheet as the intermediate layer 230.

The illustration in FIG. 2 is an example of topology multilayering. It should be appreciated that any combination of cores with only open, only closed or combinations of open and closed cells could be configured from either a single material or different materials for each layer and face sheet within the context of the present invention. The closed cell structure has very good air blast resistance because its core is stretch resistant and compression of entrapped gases or combinations of gases and fluids provides a resisting force to core crushing during localized impact. Under dynamic blast conditions, core crushing compresses the air/fluid inside the cubic volume of the individual cells offering reactive resistance to wall compression and delaying the buckling/wrinkling of the individual web members of the square honeycomb cell. Thus the time dependent energy absorption come from densification through compressing air inside the individual honeycomb cell combined with severe plastic deformation of the cell walls. Strain and strain rate hardening under dynamic loading rate can also be exploited by for additional energy dissipation by appropriate selection of the base material (any metal, polymer, ceramic or composite is envisioned here). The core density and material can be adjusted to make it the weaker layer in the system. This structure, especially when it contains vapor/fluid (or particulate solid/liquid/gaseous) mixtures, can then also provide significant mitigation of the shock waves created by projectile impacts. The second layer 220 shown in FIG. 2 is a pyramidal lattice core sandwich panel but it could be any open cell structure. Its strength and crush resistance can be controlled by the cell relative density, the angle of the trusses, the second moment of inertia of the trusses and the material used to make the core. It can be designed to crush at a higher or lower level of blast pressure than the lower panel providing a means for selecting the depth within the functionally graded panel where blast energy dissipation occurs.

Figure 3:
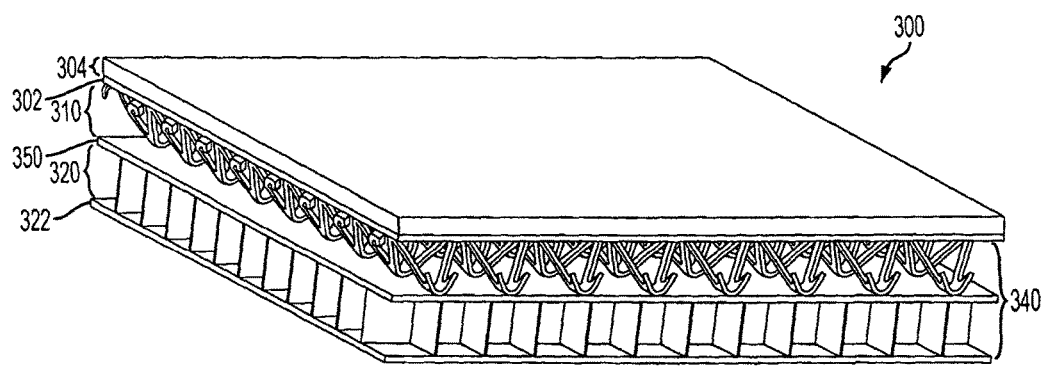
FIG. 3 provide a schematic perspective view of a two layer hybrid design with ceramic backing for Ballistic Protection as an aspect of an embodiment of the present invention.

The strong layer in the various system associated with a plurality of embodiments of the present invention disclosed can also provide a stiff, strong backing for supporting other structures that help defeat a ballistic threat. By attaching ceramic or ballistic fabrics to the front or back face of the two layer panel or by filling the truss space with ceramic, ballistic fabrics or hard polymers, the ballistic performance of the functionally graded sandwich panel can be significantly elevated without reducing the blast resistance or load supporting functionality of the structure. The truss member can also interact and slow some projectiles helping to dissipate their transverse momentum. An example of such hybrid armor with a ceramic face shield is shown in FIG. 3. The sandwich structure 300 comprises a first layer 310, a second layer 320 with an intermediate member 350 there between to form a core 340. On opposite sides of the sandwich structure 300 is a front panel 302 and a back panel 322. This particular, non-limiting example provides a periodic cellular material (PCM) panel 300 that combines a square honeycomb in the second layer 220 and pyramidal truss core in the first layer 310 using a thin intermediate face sheet as the intermediate layer 250. Further a ballistic protection layer 304 is mounted to the front panel 302 for additional ballistic protection. An exemplary material for the ballistic protection layer 304 is ceramic, and other possible materials include, but not limited thereto, the following: Ceramic-fiber reinforced ceramics with fibers S-2, SiC fibers; polymer fiber reinforced composites with fibers such as polyethylene, polypropolyne; metallic plates made from intermetallics such as titanium boride, other advanced metals harder than conventional roll hardened steels.

The ceramic shield can be attached to the front or back face sheet of the panel depending on the requirement. Contrary to the illustration of FIG. 3, if the square honeycomb core of the second layer 320 is placed on the front to absorb the impulse from a blast, fracture of the ceramic is prevented and the ceramic shield on the back side remains suitable for projectile protection. On the other hand, consistent with the illustration of FIG. 3, if the ceramic is on the front surface, the sandwich panel provides a rigid backing increasing the efficiency of the ceramic during ballistic defeat. The sandwich panel can then serve as a fragment arrest system.

A second design embodiment envisioned in this invention utilizes an all open cell core for both the first layer and second layer. This could be a single or multilayer structure with open or solid intermediate face sheets in the latter case. This design can employ multilayer pyramidal, tetrahedral or any other tusscore/lattice structures including any of those shown in FIG. 1.

Figure 4:
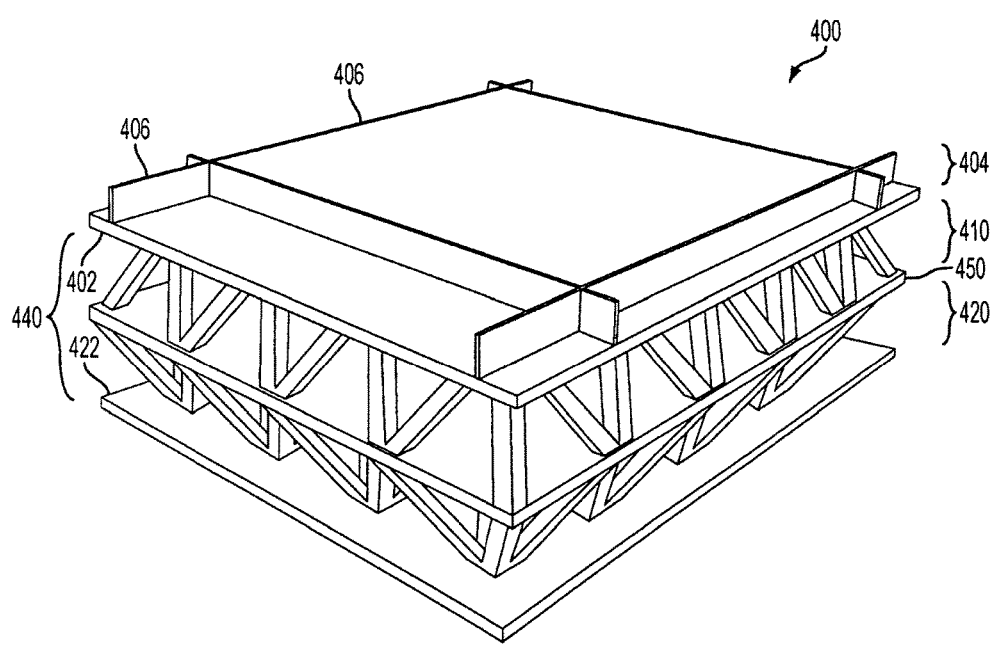
FIG. 4 provide a schematic perspective view of a multi-layer Pyramidal truss core attached to the square honeycomb core as an aspect of an embodiment of the present invention. The honeycomb cells may be filled with SiC ceramic or other desired material. The panel is may be aluminum alloy or other desired material.

Turning to FIG. 4, FIG. 4 provides a photographic depiction of the sandwich structure 400 having open cell core 440 for both the first layer 410 and second layer 420, both of which are pyramidal truss core layers; and an intermediate member 450 there between to form a core 440. On opposite sides of the sandwich structure 400 is a front panel 402 and a back panel 422. Further a ballistic protection layer 404 is mounted to the front panel 402 for additional ballistic protection. An exemplary material for the ballistic protection layer 304 is ceramic, and other possible materials include, but not limited thereto, the following: Ceramic-fiber reinforced ceramics with fibers S-2, SiC fibers; polymer fiber reinforced composites with fibers such as polyethylene, polypropolyne; metallic plates made from intermetallics such as titanium boride, other advanced metals harder than conventional roll hardened steels. In an embodiment the ballistic protection layer 404 may be disposed or located within a honeycomb type cell 406. While only one cell is illustrated it is envisioned that multiple cells may be implemented to contain the material. It should also be appreciated that a variety of cell structures may be implemented other than honeycomb as desired or required such as hexagonal, square, triangular, cylindrical etc.

Figure 5:
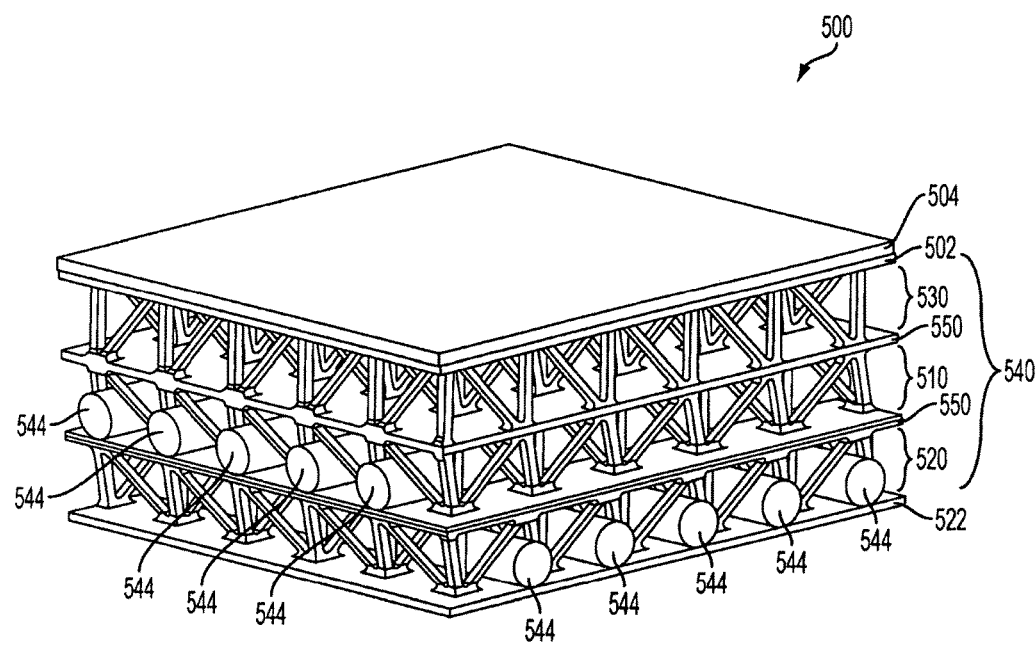
FIG. 5 provide a schematic perspective view of a schematic of a three layered Pyramidal Trusscore structure with cylindrical ceramic rods (or other material) inserted into two layers to provide cross linked grid pattern as an aspect of an embodiment of the present invention.

Turning to FIG. 5, FIG. 5 provides a photographic depiction of the sandwich structure 500 having open cell core 540 for both the first layer 510 and second layer 520, both of which are pyramidal truss core layers; and an intermediate member 550 there between. Further, an additional layer 530 is provided before the first layer 510 (or second layer, for example) to form a core 540, with an intermediate member 550 there between the first layer and additional layer. On opposite sides of the sandwich structure 500 is a front panel 502 and a back panel 522. Further a ballistic protection layer 504 is mounted to the front panel 502 for additional ballistic protection. An exemplary material for the ballistic protection layer 504 is ceramic, and other possible materials include, but not limited thereto, the following: Ceramic-fiber reinforced ceramics with fibers S-2, SiC fibers; polymer fiber reinforced composites with fibers such as polyethylene, polypropolyne; metallic plates made from intermetallics such as titanium boride, other advanced metals harder than conventional roll hardened steels.

Still referring to FIG. 5, the exemplary and non-limiting illustration demonstrates a three layered Pyramidal Trusscore structure 500 with ceramic rods 544 inserted into two layers 510, 520 to provide cross linked grid pattern. A polymeric layer 530 is shown on the front of the structure to provide impact protection and reduce the probability of face sheet failure during dynamic loading.

Figure 6:
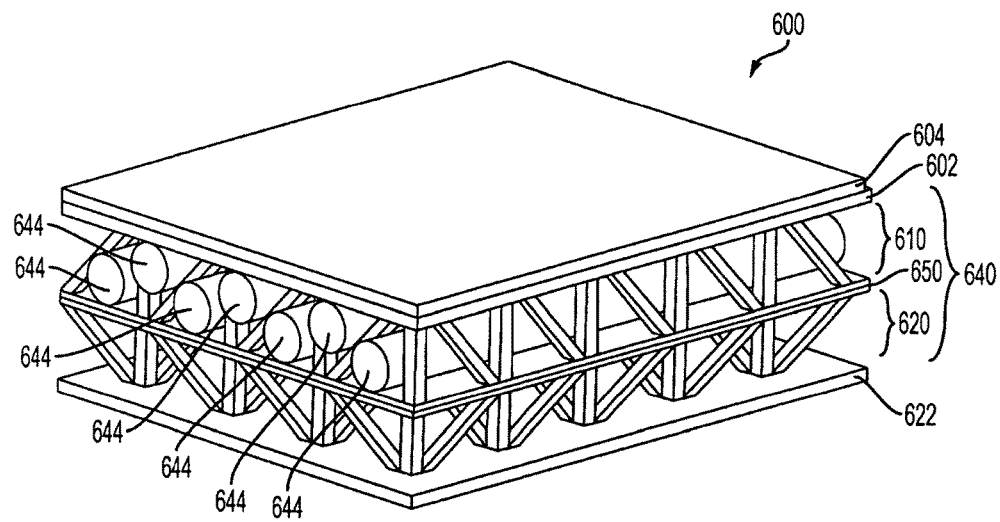
FIG. 6 provide a schematic perspective view of a two layer Pyramidal Trusscore panel structure with cylindrical ceramic rods (or other material) inserted into the one layer as an aspect of an embodiment of the present invention.
Figure 7A:
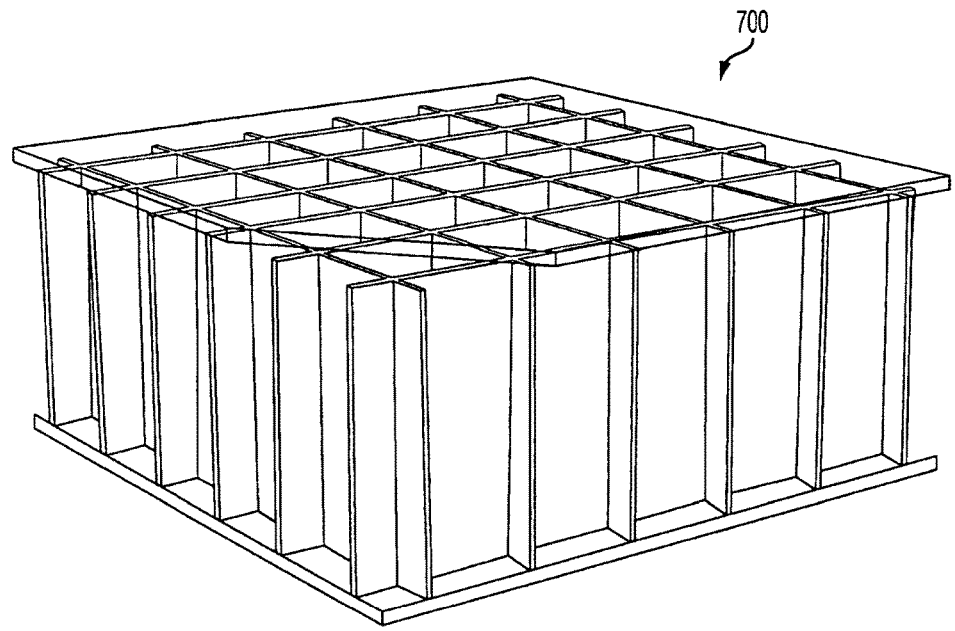
FIG. 7 provides a variety of schematic perspective views of examples of periodic cellular material topologies as an aspect of various embodiments of the present invention.
Figure 7B:
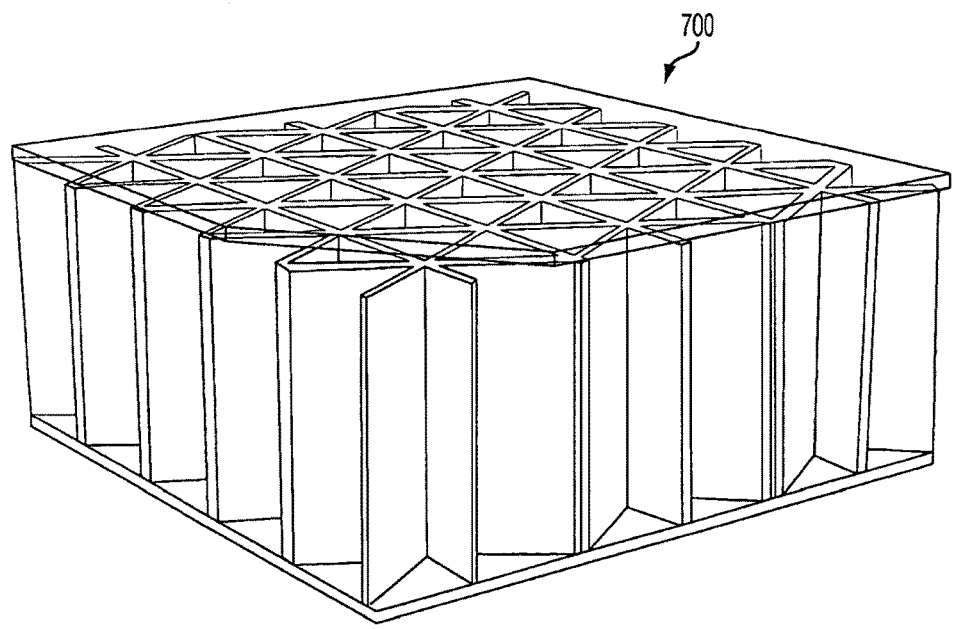
Figure 7C:
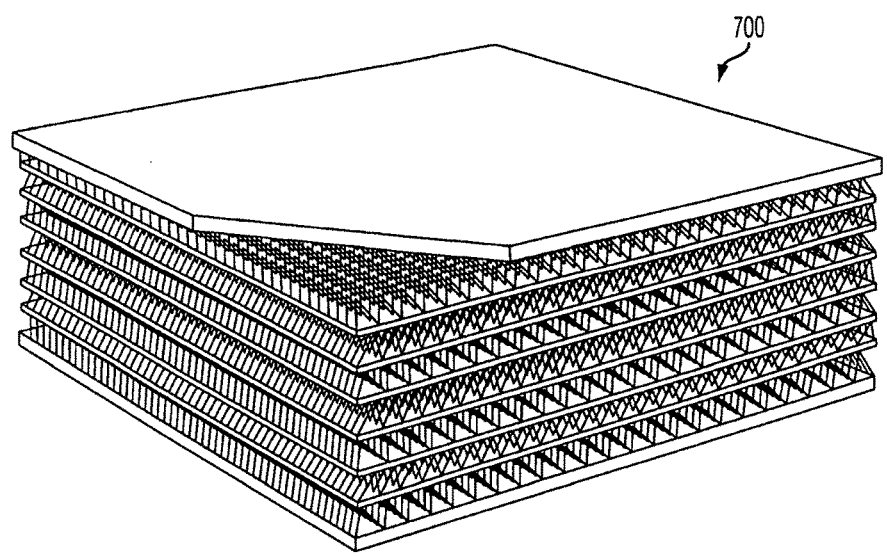
Figure 7D:
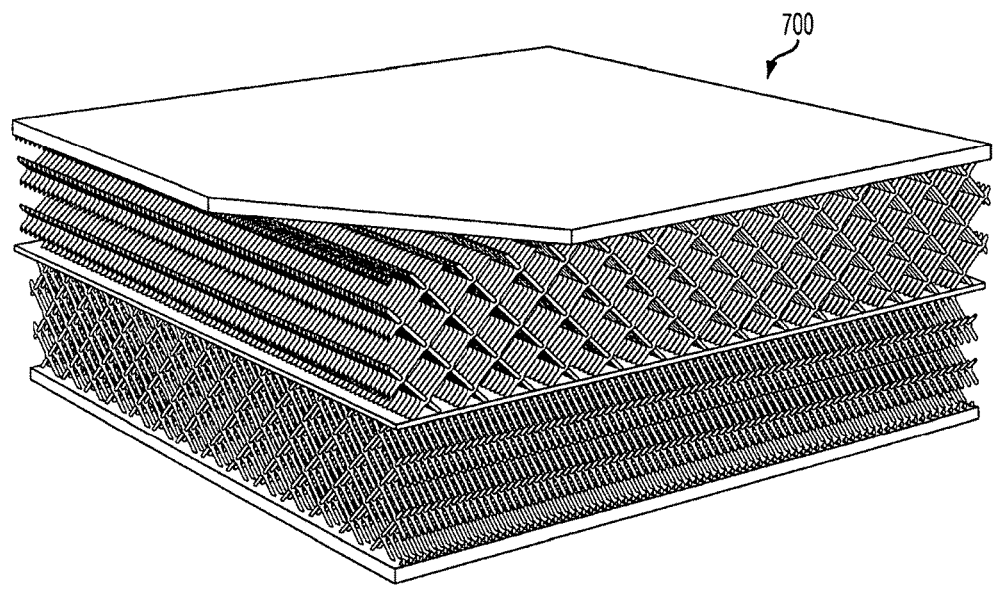
Figure 7E:
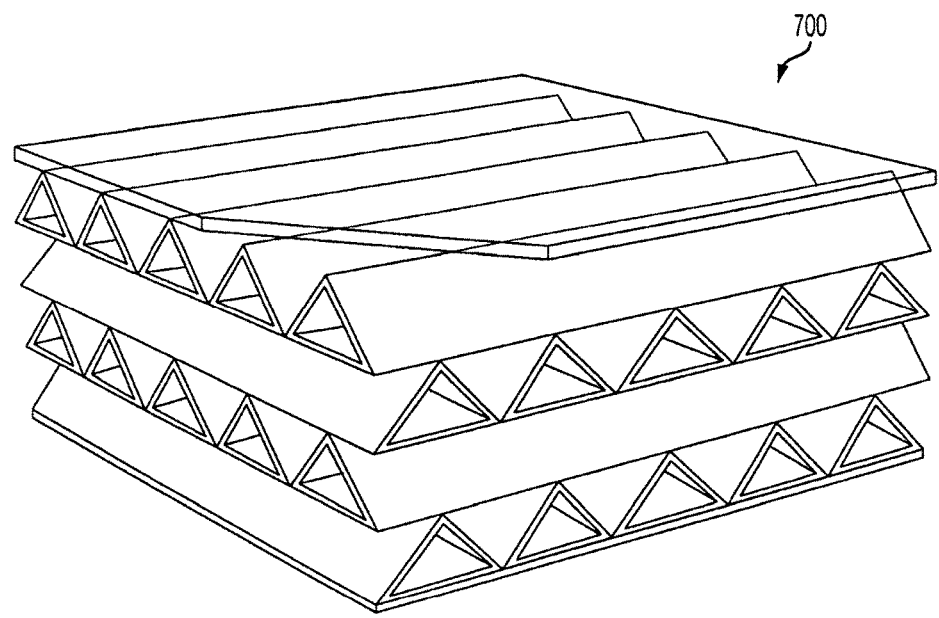
Figure 7F:
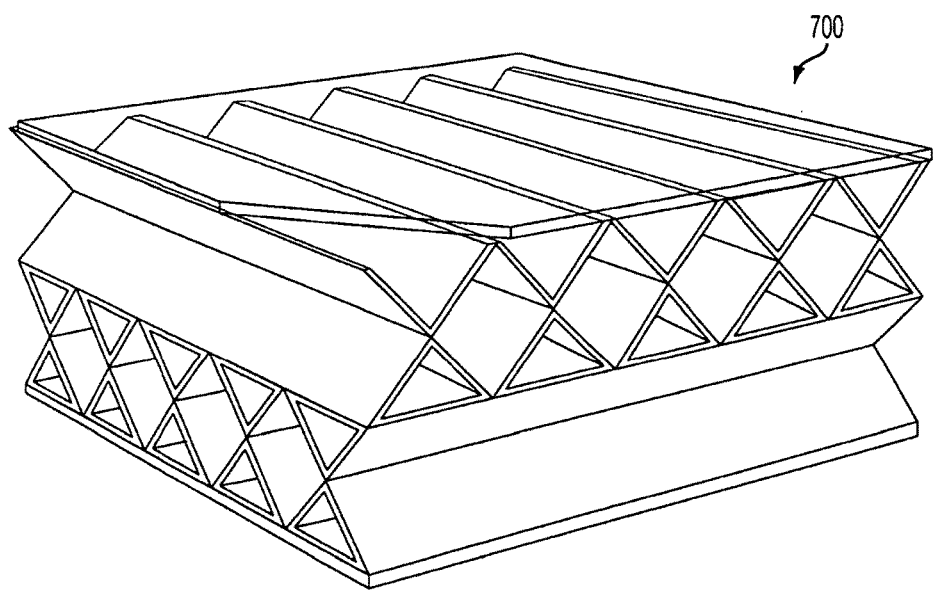

Turning to FIG. 6, FIG. 6 provides a photographic depiction of the sandwich structure 600 having open cell core 640 for both the first layer 610 and second layer 620, both of which are pyramidal truss core layers; and an intermediate member 650 there between. On opposite sides of the sandwich structure 600 is a front panel 602 and a back panel 622. Further a ballistic protection layer 604 is mounted to the front panel 602 for additional ballistic protection. An exemplary material for the ballistic protection layer 604 is ceramic, and other possible materials include, but not limited thereto, the following: Ceramic-fiber reinforced ceramics with fibers S-2, SiC fibers; polymer fiber reinforced composites with fibers such as polyethylene, polypropolyne; metallic plates made from intermetallics such as titanium boride, other advanced metals harder than conventional roll hardened steels.

Still referring to FIG. 6, the exemplary and non-limiting illustration demonstrates a two layer Pyramidal Trusscore panel structure 600 with cylindrical ceramic rods 644 inserted into the one layer 610.

It is also possible to incorporate the interstitial housing 644 such as ceramic components (other applicable materials include Ceramic-fiber reinforced ceramics with fibers S-2, SiC fibers; polymer fiber reinforced composites with fibers such as polyethylene, polypropolyne; metallic plates made from intermetallics such as titanium boride, other advanced metals harder than conventional roll hardened steels.) inside the core. Examples of these designs are shown in FIGS. 5 and 6. The interstitial housing s 544, such as ceramic components used for these designs may be for example, prismatic or circular rods that can either closely or loosely fit within lattice pores. Other interstitial housing shapes may be employed within the context of the invention and as discussed herein. The ceramic rods can be encased in a metallic tube casing to provide enhanced ballistic performance and reduce mechanical shock that can be transmitted to the rods. As will be discussed in further detail herein, polymers, metals, ceramic powders and their combinations can also be used to fully or partially fill the remaining void spaces in the structure of the layers 510, 610, 510, 610, and 530. As will be discussed in further detail herein, polymers or polymer fabrics can also be added to the system to modify ballistic responses and/or interact in beneficial ways with air blast created shock waves.

FIG. 8 schematically illustrate various embodiments of aspects of aspects of the present invention sandwich structure 800 comprises a first layer 810 forming a core 840 and on opposite sides of the sandwich structure 800 is a front panel 802 and a back panel 822.

Figures 8A, 8B:
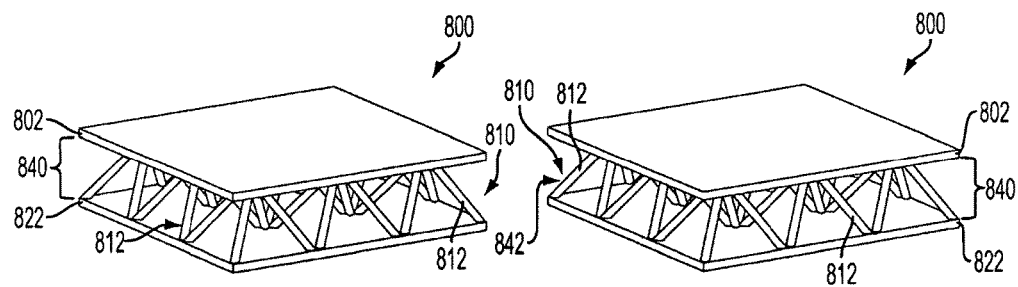
FIGS. 8(A)-(E) provide a variety of schematic perspective views of examples of various embodiments of the present invention sandwich structure.

FIG. 8(A) illustrates the sandwich structure 800 that is a generally empty lattice structure wherein the first layer 810 is an open-cell lattice structure comprising a plurality or an array of pyramidal trusses 812.

FIG. 8(B) illustrates the sandwich structure 800 that is a lattice structure wherein the first layer 810 is an open-cell lattice structure comprising a plurality or an array of pyramidal trusses 812. A filler portion 842, such as an elastomer (or other desired or required filler material) fills the void or volume of the open core. The elastomer may be polyurethane, polyeuria or other desired polymers or materials or other filler materials.

Figures 8C, 8D:
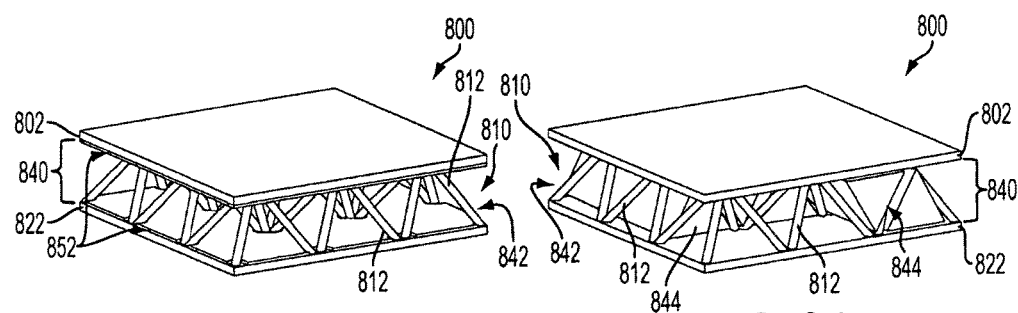

FIG. 8(C) illustrates the sandwich structure 800 that is similar to the embodiment disclosed in FIG. 8(B). Additionally, a Kevlar substrate 852 is disposed in communication with the inner sides of front panel 802 and back panel 822. The Kevlar substrate may be Kevlar fabric, S-2 fabric, Dynema fabric, Aramid fabric, or other desired materials or structures. The elastomer (or other desired or required material) fills the void or volume of the open core of the present embodiment.

FIG. 8(D) illustrates the sandwich structure 800 that is similar to the embodiment disclosed in FIG. 8(B) further including interstitial housings 844 disposed so as to span across the sandwich structure 800, or at least portions of the sandwich structure as desired or required. The interstitial housings may be ceramic prisms or other suitable materials or structures. The interstitial housings may comprise: Ceramic-fiber reinforced ceramics with fibers S-2, SiC fibers; polymer fiber reinforced composites with fibers such as polyethylene, polypropolyne; metallic plates made from intermetallics such as titanium boride, other advanced metals harder than conventional roll hardened steels The interstitial housings 844 conform to the geometry or void created by the trusses 812 of the layer 810. The conformance is designed for optimizing structural integrity and ballistic and blast mitigation as desired or required. The elastomer (or other desired or required material) fills the void or volume of the open core of the trusses and interstitial housings.

Figure 8E:
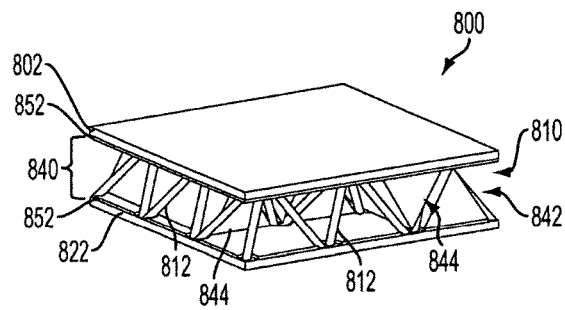

FIG. 8(E) illustrates the sandwich structure 800 that is similar to the embodiment disclosed in FIG. 8(C) having not only the Kevlar substrate 852 disposed in communication with the inner sides of front panel 802 and back panel 822, but also interstitial housings 844 disposed so as to span across the sandwich structure 800, or at least portions of the sandwich structure as desired or required. The interstitial housings 844 conform to the geometry or void created by the trusses 812 of the layer 810. The conformance is designed for optimizing structural integrity and ballistic and blast mitigation as desired or required. The elastomer (or other desired or required material) fills the void or volume of the open core of the trusses, Kevlar substrate, and the interstitial housings.

FIG. 9 provides photographic depictions of cross-sectional views of a prototype exemplary embodiment of the present invention sandwich structure 900 comprising a first layer 910 forming a core 940 and on opposite sides of the sandwich structure 900 is a front panel 902 and a back panel 922.

Figure 9A:
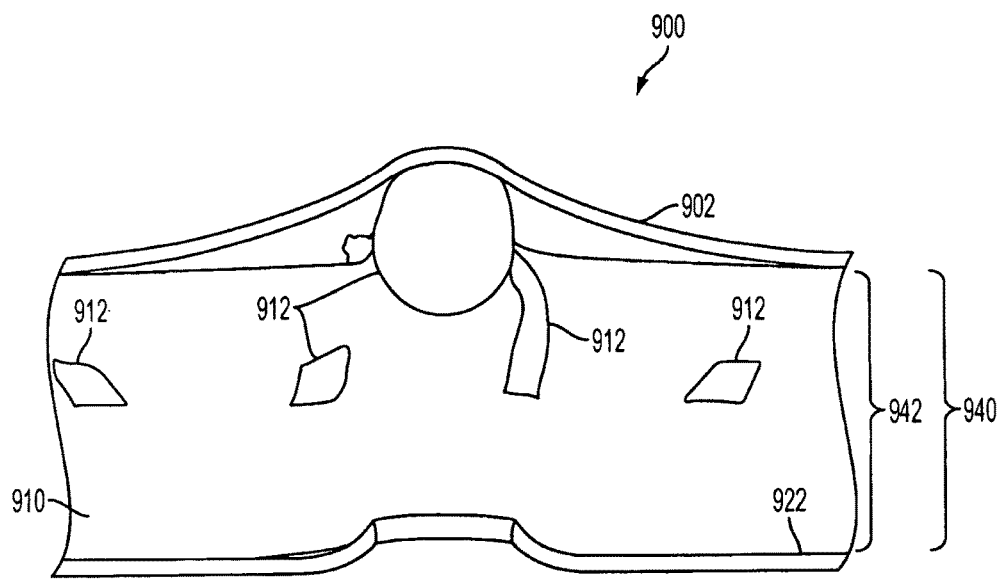
FIGS. 9(A)-(B) provide a variety of schematic cross-sectional views of examples of various embodiments of the present invention sandwich structure.
Figure 9B:
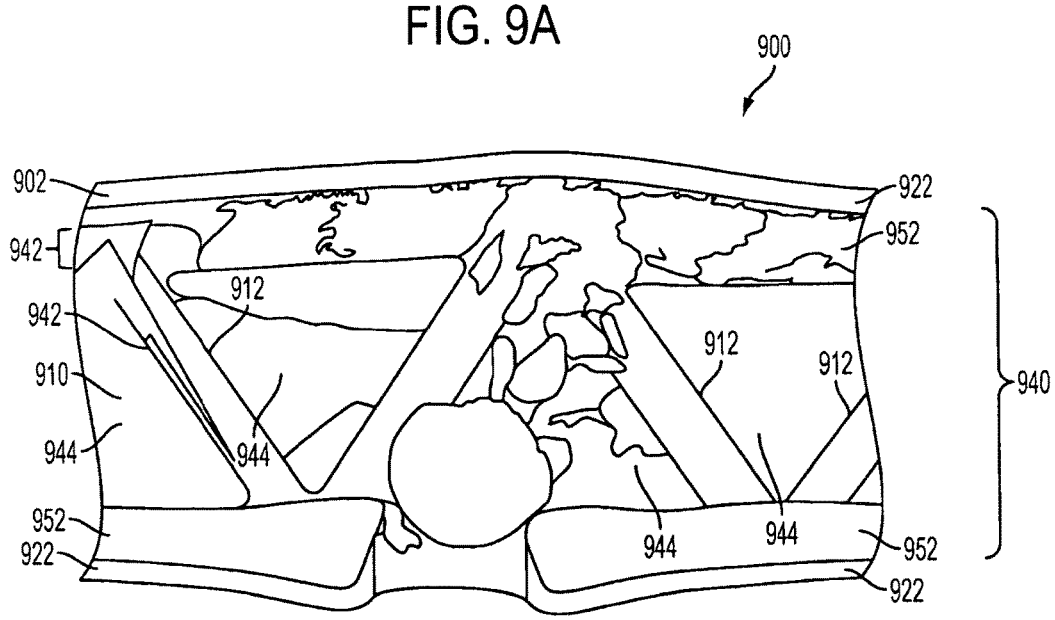

Referring to the cross-sectional view of FIG. 9(B), visible is Kevlar substrate 952 disposed in communication with the inner sides of front panel 902 and back panel 922, the interstitial housings 944 disposed so as to span across the sandwich structure 900, or at least portions of the sandwich structure as desired or required. The interstitial housings 944 conform to the geometry or void created by the trusses 912 of the layer 910. A small portion of the elastomer 942 (or other desired or required material or filler portion or material) is visible that is provided to fill the void or volume of the open core of the trusses 912, Kevlar substrate, and/or the interstitial housings.

Referring to the cross-sectional view of FIG. 9(A), much less is visible compared to the cross-sectional view of FIG. 9(B). For instance, visible in FIG. 9(A) is front panel 902 and back panel 922, elastomer 942 (or other desired or required material or filler portion or material) is visible that fills the void or volume of the open core of the trusses 912, whereby only segments of the trusses are visible.

Figure 10A:
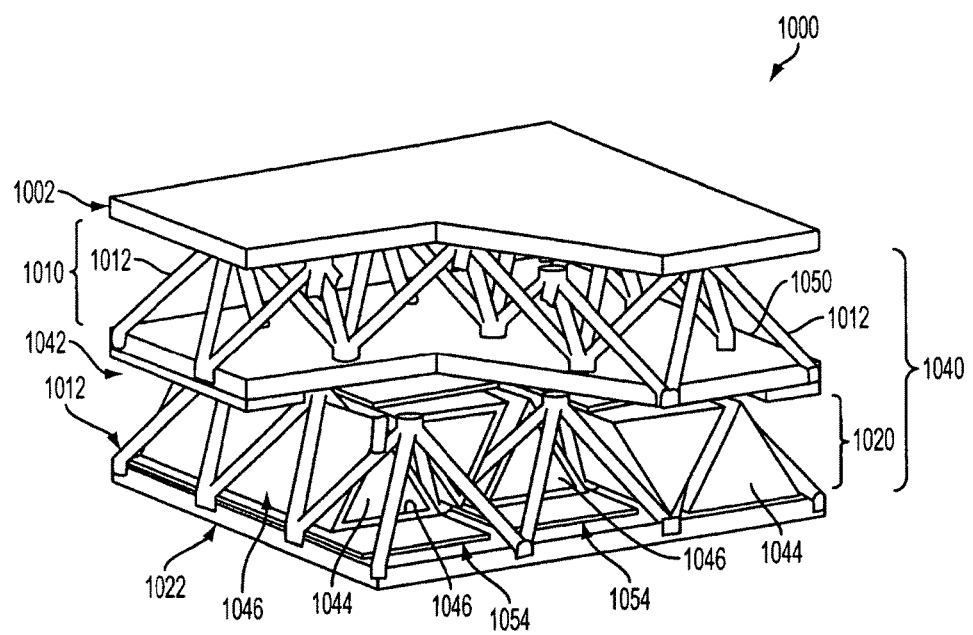
FIG. 10(A) provides a schematic perspective view of an example of an embodiment of the present invention sandwich structure.

FIG. 10(A) provides a schematic perspective view of an exemplary embodiment of the present invention sandwich structure 1000 comprising a first layer 1010, a second layer 1020 with an intermediate member 1050 there between to form a core 1040. On opposite sides of the sandwich structure 1000 is a front panel 1002 and a back panel 1022. It should be appreciated that the front panel 1002 may be a light metal/composite face sheet (e.g., outer face facesheet) or other material or structure as desired or required. It should be appreciated that the first layer 1010 may be an empty layer designed to mitigate blast over pressure. It should be appreciated that the first and second layers 1010, 1020, may be open-cell lattice structures made up of a plurality of trusses being pyramidal lattice type. Other types of cellular or lattice structures may be implemented as desired or required. It should be appreciated that the back panel 1022 may be a light metal/composite face sheet (e.g., back facesheet) or other material or structure as desired or required.

Still referring to FIG. 10(A), an intermediate layer 1050 is provided as well as a ballistic substrate 1054 mounted or in communication with the back panel 1022 and the bottom side of the intermediate layer 1050 for additional ballistic protection. It should be appreciated that one or more of the ballistic substrate 1054 may be a Kevlar substrate. It should be appreciated that one or more of the ballistic substrate 1054 may be a piezoelectric active damper system or device. It should be appreciated that one or more of the ballistic substrate 1054 may be a piezoelectric power generation system or device.

Figure 10B:
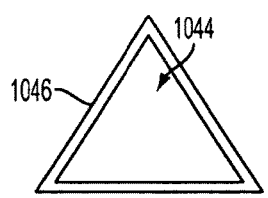
FIG. 10(B) provides a schematic cross-sectional view of a portion of the sandwich structure illustrated in FIG. 10(A).

Still referring to FIG. 10(A), further provided are interstitial housings 1044 disposed so as to span across the sandwich structure 1000, or at least portions of the sandwich structure as desired or required. The interstitial housings 1044 may be ceramic prisms or other suitable materials or structures. The interstitial housings may a variety of materials including $B_4C$ or SiC ceramic, but not limited thereto. FIG. 10(B) provides an enlarged cross-sectional partial view of the interstitial housings 1044. The housing 1044 may have an encasement 1046 surrounding it or a portion of it. The encasement 1046 may be, for example but not limited thereto, high coefficient of thermal expansion (CTE) of metal or the like compresses the ceramic after fabrication.

Still referring to FIG. 10(A), further an elastomer (or other desired or required material) is provided to fill the void or volume of the open core of the trusses 1012, ballistic substrate 1054, and the interstitial housings 1044. The elastomer, material or other material may be tailored for optimum results of the structure and function thereof. The elastomer or fill material 1042 may be tailored (e.g., fills all voids or as desired or required).

These aforementioned embodiments illustrate the flexibility of having a variety of fabrication and structural approaches. For instance, depending on the mass density requirements the metallic panels can be fabricated with steel, aluminum alloy, titanium and magnesium alloy to meet the required performance. The ceramic component shapes can be of any variety of oxides, nitrides, and/or carbides processed by hot pressing or reaction bonding/sintering methods. These can be permanently integrated into the structure or added in the field when required. The hard materials placed within the cores can be maintained in place by a variety of means including potting in foam or polymers, or with small particle size granular materials which also provide additional blast protection capabilities.

In summary, an aspect of various embodiments of the present invention provide a family of hybrid periodic cellular materials structures that are structurally strong and capable of mitigating high kinetic energy blast waves and high velocity projectiles. An aspect utilizes multilayered cores topologies and materials that exhibit high levels of energy absorption through plastic deformation, and ability to deflect the incident projectile so as to reduce the momentum forces. These highbred composite armor structures can be manufactures by combinations of metals, ceramics, and polymers.

Lightweight cellular structures, both stochastic and periodic, can be manufactured from numerous metals and metal alloys by a wide variety of vapor-, liquid- and solid-state processes. The properties of these cellular structures depend upon the properties of the base metal alloy, the relative density of the structure, and the distribution of material within the structure (i.e. stochastic, periodic, open or closed cell, cell size, etc.).

Periodic cellular metals can be manufactured by various methods including: investment casting, lattice block construction, constructed metal lattice and metal textile lay-up techniques. These techniques for manufacturing periodic cellular metals enable the metal topology to be controlled that efficient load supporting structures can be made. They are especially useful when used as cores of sandwich panels.

Exemplary embodiment of present invention herein provides, among other things, a process, which utilizes nonwoven wire fabrication routes for the manufacture of periodic cellular cores.

This exemplary process associated with the various embodiments and inventive concept allows the strength of the structure to be precisely controlled by the relative density of the structure, which is a function of the wire and cell size and shape as well as the stacking sequence. In addition, these materials lend themselves to multifunctional integration for heat transfer, power storage, energy absorption, etc applications. Also, this manufacturing technique should be economically viable when compared with other periodic cellular metals manufacturing technologies.

It should be appreciated that the various embodiments of the present invention sandwich structure or any sub-combinations thereof may be fabricated utilizing a number of manufacturing methods. For instance, some exemplary manufacturing methods of the sandwich structure or any components thereof may include the following methods or combination thereof: brazing, welding, soldering, and near neat shape or net shape fabrication using techniques such as extrusion, or casting. For example, a method may produce the truss core structures utilizing extrusion that provide very good nodal strength and resultant performance.

It should be appreciated that various aspects of embodiments of the present method, system, devices, article of manufacture, and compositions may be implemented with the following methods, systems, devices, article of manufacture, and compositions disclosed in the following U.S. Patent Applications, U.S. Patents, and PCT International Patent Applications and are hereby incorporated by reference herein and co-owned with the assignee:

International Application No. PCT/US2008/060637 entitled "Heat-Managing Composite Structures," filed Apr. 17, 2008.

International Application No. PCT/US2007/022733 entitled "Manufacture of Lattice Truss Structures from Monolithic Materials," filed Oct. 26, 2007.

International Application No. PCT/US2007/012268, entitled "Method and Apparatus for Jet Blast Deflection," filed May 23, 2007.

International Application No. PCT/US04/04608, entitled "Methods for Manufacture of Multilayered Multifunctional Truss Structures and Related Structures There from," filed Feb. 17, 2004, and corresponding U.S. application Ser. No. 10/545,042, entitled "Methods for Manufacture of Multilayered Multifunctional Truss Structures and Related Structures There from," filed Aug. 11, 2005.

International Application No. PCT/US03/27606, entitled "Method for Manufacture of Truss Core Sandwich Structures and Related Structures Thereof," filed Sep. 3, 2003, and corresponding U.S. application Ser. No. 10/526,296, entitled "Method for Manufacture of Truss Core Sandwich Structures and Related Structures Thereof," filed Mar. 1, 2005.

International Patent Application Serial No. PCT/US03/27605, entitled "Blast and Ballistic Protection Systems and Methods of Making Same," filed Sep. 3, 2003

International Patent Application Serial No. PCT/US03/23043, entitled "Method for Manufacture of Cellular Materials and Structures for Blast and Impact Mitigation and Resulting Structure," filed Jul. 23, 2003

International Application No. PCT/US03/16844, entitled "Method for Manufacture of Periodic Cellular Structure and Resulting Periodic Cellular Structure," filed May 29, 2003, and corresponding U.S. application Ser. No. 10/515,572, entitled "Method for Manufacture of Periodic Cellular Structure and Resulting Periodic Cellular Structure," filed Nov. 23, 2004.

International Application No. PCT/US02/17942, entitled "Multifunctional Periodic Cellular Solids and the Method of Making Thereof," filed Jun. 6, 2002, and corresponding U.S. application Ser. No. 10/479,833, entitled "Multifunctional Periodic Cellular Solids and the Method of Making Thereof," filed Dec. 5, 2003.

International Application No. PCT/US01/25158 entitled "Multifunctional Battery and Method of Making the Same," filed Aug. 10, 2001, U.S. Pat. No. 7,211,348 issued May 1, 2007 and corresponding U.S. application Ser. No. 11/788,958, entitled "Multifunctional Battery and Method of Making the Same," filed Apr. 23, 2007.

International Application No. PCT/US01/22266, entitled "Method and Apparatus For Heat Exchange Using Hollow Foams and Interconnected Networks and Method of Making the Same," filed Jul. 16, 2001, U.S. Pat. No. 7,401,643 issued Jul. 22, 2008 entitled "Heat Exchange Foam," and corresponding U.S. application Ser. No. 11/928,161, "Method and Apparatus For Heat Exchange Using Hollow Foams and Interconnected Networks and Method of Making the Same," filed Oct. 30, 2007.

International Application No. PCT/US01/17363, entitled "Multifunctional Periodic Cellular Solids and the Method of Making Thereof," filed May 29, 2001, and corresponding U.S. application Ser. No. 10/296,728, entitled "Multifunctional Periodic Cellular Solids and the Method of Making Thereof," filed Nov. 25, 2002.

It should be appreciated that various aspects of embodiments of the present method, system, devices, article of manufacture, and compositions may be implemented with the following methods, systems, devices, article of manufacture, and compositions disclosed in the following U.S. Patent Applications, U.S. Patents, and PCT International Patent Applications and are hereby incorporated by reference herein and co-owned with the assignee:

1. U.S. Pat. No. 5,040,966, to Weisse, D., "Die for Making a Tetrahexagonal Truss Structure," Aug. 20, 1991.
2. U.S. Pat. No. 3,869,778, to Yancey, R., "Article of Manufacture with Twisted Web," Mar. 11, 1975.
3. U.S. Pat. No. 6,077,370, to Solntsev, K., et al., "Thin-Walled Monolithic Metal Oxide Structures Made from Metals, and Methods for Manufacturing Such Structures," Jun. 20, 2000.
4. U.S. Pat. No. 3,298,402, to Hale, J. R., "Method for Fabricating Space Structures," Jan. 17, 1967.
5. U.S. Pat. No. 1,154,254, to Lachman, M., "Sheet Metal Panel Work," Sep. 21, 1915.
6. U.S. Pat. No. 2,481,046, to Scurlock, J. C., "Panel Structure," Sep. 6, 1949.
7. U.S. Pat. No. 4,918,281, to Blair, W., "Method of Manufacturing Lightweight Thermo-Barrier Material," Apr. 17, 1990.
8. U.S. Pat. No. 4,522,860, to Scott, J., "Material for Reinforcing Core in a Structure," Jun. 11, 1985.
9. U.S. Pat. No. 6,207,256 B1, to Tashiro, K., "Space Truss Composite Panel," Mar. 27, 2001.
10. U.S. Pat. No. 5,349,893, to Dunn, E., "Impact Absorbing Armor," Sep. 27, 1994.
11. U.S. Pat. No. 4,529,640, to Brown, R., et al., "Spaced Armor," Jul. 16, 1985.
12. U.S. Pat. No. 5,110,661 to Groves, T., "Armor Component," May 5, 1992.
13. U.S. Patent Application Publication No. US 2001/0030023 A1, to Tippett, S., "Composite Expansion Joint Material," Oct. 18, 2001.
14. U.S. Pat. No. 4,758,299, to Burke, D., "Method of Making Composite Foam Structural Laminate," Jul. 19, 1988.
15. U.S. Pat. No. 6,740,381 B2 to Day, S., et al., "Fiber Reinforced Composite Cores and Panels," May 25, 2004.
16. U.S. Pat. No. 5,455,096, to Toni, D., et al., "Complex Composite Sandwich Structure Having a Laminate and a Foaming Ashesive Therein and a Method for Making the Same," Oct. 3, 1995.
17. U.S. Pat. No. 5,970,843 to Strasser, T., et al., "Fiber Reinforced Ceramic Matrix Composite Armor," Oct. 26, 1999.

18. U.S. Pat. No. 5,972,468, to Welch, W., et al., "Composites and Multi-Composites," Oct. 26, 1999.
19. U.S. Pat. No. 5,773,121, to Meteer, C., et al., "Syntactic Foam Core Incorporating Honeycomb Structure for Composites," Jun. 30, 1998.
20. U.S. Pat. No. 4,453,367, to Geyer, E., et al., "Honeycomb Core Material and Sandwich Construction Structural Building Materials Incorporating Same," Jun. 12, 1984.
21. U.S. Pat. No. 4,194,255, to Poppe, W., et al., "Foam Spring," Mar. 25, 1980.
22. U.S. Pat. No. 5,890,268, to Mullen, et al., "Method of Forming Closed Cell Metal Composites," Apr. 6, 1999.
23. U.S. Pat. No. 4,968,367, to Diderich, et al., "Process for Producing Formed Article of Tubular Elements," Nov. 6, 1990.
24. U.S. Pat. No. 6,418,832 to Colvin, D., "Body Armor," Jul. 16, 2002.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A sandwich structure for supporting loads, mitigating blast pressure, and resisting projectile penetration, said structure comprising:
   a) a core, wherein said core comprises:
      a first open-cell lattice structure layer,
      a second open-cell lattice structure layer, and
      an intermediate panel disposed between said first open-cell lattice structure layer and said second open-cell lattice structure layer;
   b) a first layer panel in mechanical communication with said first open-cell lattice structure layer distal from said second open-cell lattice structure layer;
   c) a second layer panel in mechanical communication with said second open-cell lattice structure layer distal from said first open-cell lattice structure layer;
   d) a plurality of elongated interstitial housings that continuously span across a full length of at least one of said first open-cell lattice structure or said second open-cell lattice structure, wherein said interstitial housings conform to voids in said open cells of said open-cell lattice structures such that said interstitial housings substantially fill said voids, and wherein said plurality of elongated interstitial housings are arranged to be in parallel with each other; and
   e) a filler portion disposed in any spaces between said interstitial housings and open cells of said open-cell lattice structures; and in voids created by said open cells of said open-cell lattice structures.

2. The sandwich structure of claim 1 further comprising a first ballistic substrate in mechanical communication with said second open-cell lattice structure layer on a side thereof proximal to said first open-cell lattice structure layer.

3. The sandwich structure of claim 2, further comprising a second ballistic substrate in mechanical communication with said intermediate panel on a side thereof proximal to said second open-cell lattice structure layer.

4. The sandwich structure of claim 1, further comprising a first ballistic substrate in mechanical communication with said first open-cell lattice structure layer on a side thereof proximal to said second open-cell lattice structure layer.

5. The sandwich structure of claim 4, further comprising a second ballistic substrate in mechanical communication with said intermediate panel on a side thereof proximal to said first open-cell lattice structure layer.

6. The sandwich structure of claim 4, wherein said first ballistic substrate comprises at least one of an aramid fabric, a ballistic fabric, or a combination thereof.

7. The sandwich structure of claim 4, wherein said first ballistic substrate comprises ceramic-fiber reinforced material.

8. The sandwich structure of claim 7, wherein said ceramic-fiber reinforced material comprises at least one of: S-2 or SiC fibers, or a combination thereof.

9. The sandwich structure of claim 4, wherein said first ballistic substrate comprises polymer-fiber reinforced material.

10. The sandwich structure of claim 9, wherein said polymer-fiber reinforce material comprises at least one of: polyethylene, polypropylene or a combination thereof.

11. The sandwich structure of claim 4, wherein said first ballistic substrate comprises metallic material.

12. The sandwich structure of claim 11, wherein said metallic material comprises at least one of: titanium boride, an advanced metal harder than conventional roll hardened steel, or a combination thereof.

13. The sandwich structure of claim 1, further comprising a second ballistic protection layer in mechanical communication with said second open-cell lattice structure layer on a side thereof distal from to said first open-cell lattice structure layer.

14. The sandwich structure of claim 13, wherein said second ballistic protection layer comprises:
at least one of a piezoelectric active damper device and a piezoelectric power generation device.

15. The sandwich structure of claim 13, wherein said second ballistic protection layer comprises at least one of an aramid fabric, a ballistic fabric, or a combination thereof.

16. The sandwich structure of claim 13, wherein said second ballistic protection layer comprises ceramic-fiber reinforced material.

17. The sandwich structure of claim 7, wherein said ceramic-fiber reinforced material comprises at least one of: S-2 or SiC fibers, or a combination thereof.

18. The sandwich structure of claim 13, wherein said second ballistic protection layer comprises polymer-fiber reinforced material.

19. The sandwich structure of claim 9, wherein said polymer-fiber reinforce material comprises at least one of: polyethylene, polypropylene or a combination thereof.

20. The sandwich structure of claim 13, wherein said second ballistic protection layer comprises metallic material.

21. The sandwich structure of claim 11, wherein said metallic material comprises at least one of: titanium boride, an advanced metal harder than conventional roll hardened steel, or a combination thereof.

22. The sandwich structure of claim 1, further comprising a first ballistic protection layer in mechanical communication with said first open-cell lattice structure layer on a side thereof distal from to said second open-cell lattice structure layer.

23. The sandwich structure of claim 22, wherein said first ballistic protection layer comprises:
at least one of a piezoelectric active damper device and eF piezoelectric power generation device.

24. The sandwich structure of claim 22, wherein said first ballistic protection layer comprises an aramid fiber.

25. The sandwich structure of claim 1, wherein said plurality of interstitial housings further comprise an encasement at least partially surrounding said housings.

26. The sandwich structure of claim 1, wherein said open-cell lattice structure is at least one of the following honeycomb type structures: hexagonal cell, square cell, cylindrical, and triangular cell or any combination thereof.

27. The sandwich structure of claim 1, wherein said open-cell lattice structure is at least one of the following corrugation type structures: triangular, diamond, multi-layered, flat-top corrugation arrangements, or any combination thereof.

28. The sandwich structure of claim 1, wherein said open-cell lattice structure is at least one of the following truss arrangements: tetrahedral, pyramidal, three-dimensional Kagome or any combination thereof.

29. The sandwich structure of claim 1, wherein said open-cell lattice structure is at least one of a textile weave structure, a woven wire mesh, a multilayer textile weave structure or any combination thereof.

30. The sandwich structure of claim 1, wherein said interstitial housings is at least one of the following: a prism, a rod, a block, a cylinder, a three-dimensional structure, or any combination thereof.

31. The sandwich structure of claim 1, wherein at least one of said interstitial housings is at least one of the following: battery, electronic component, heat transfer element, computer component, or a combination thereof.

32. The sandwich structure of claim 1, wherein said sandwich structure comprises at least one of:
an architectural structure,
a civil engineering field structure, a military security/protection/defense structure,
a machine structure,
an automobile structure,
a ship structure,
a freight car structure,
an aircraft structure, a spacecraft structure, a space station structure, and a submarine, ship or water craft structure.

33. The sandwich structure of claim 1, wherein at least one of said first open-cell lattice structure layer and said second open-cell lattice structure layer comprises:
a vapor/fluid or a particulate solid/liquid/gaseous mixture therein.

34. The sandwich structure of claim 1, wherein
at least one of said first open-cell lattice structure layer and said second open-cell lattice structure layer comprises the following:
steel, aluminum alloy, titanium and magnesium alloy, or any combination thereof.

35. The sandwich structure of claim 1, wherein
at least one of said intermediate panel, said first layer panel and said second layer panel comprises the following:
steel, aluminum alloy, titanium and magnesium alloy, or any combination thereof.

36. The sandwich structure of claim 1, wherein at least a portion of said core is at least one of the following: battery, electronic component, heat transfer element, computer component, or a combination thereof.

37. The sandwich structure of claim 1, wherein said interstitial housings comprise at least one of an aramid fabric, a ballistic fabric, or a combination thereof.

38. The sandwich structure of claim 1, wherein said interstitial housings comprise ceramic-fiber reinforced material.

39. The sandwich structure of claim 7, wherein said ceramic-fiber reinforced material comprises at least one of: S-2 or SiC fibers, or a combination thereof.

40. The sandwich structure of claim 1, wherein said interstitial housings comprises polymer-fiber reinforced material.

41. The sandwich structure of claim 9, wherein said polymer-fiber reinforce material comprises at least one of: polyethylene, polypropylene or a combination thereof.

42. The sandwich structure of claim 1, wherein said interstitial housings comprises metallic material.

43. The sandwich structure of claim 11, wherein said metallic material comprises at least one of: titanium boride, an advanced metal harder than conventional roll hardened steel, or a combination thereof.

44. The sandwich structure of claim 1, wherein said filler portion comprises at least one of: elastomer, polyurethane, polyurea, polymer or any combination thereof.

* * * * *